June 19, 1956  J. HARRIS  2,751,044
MEANS FOR LUBRICATING MACHINERY
Filed Aug. 18, 1953  5 Sheets-Sheet 1

INVENTOR
JOSEPH HARRIS
by Walter S. Heston
ATTORNEY

June 19, 1956 J. HARRIS 2,751,044
MEANS FOR LUBRICATING MACHINERY
Filed Aug. 18, 1953 5 Sheets-Sheet 3

INVENTOR:
JOSEPH HARRIS
by Walter S. Pleston
ATTORNEY

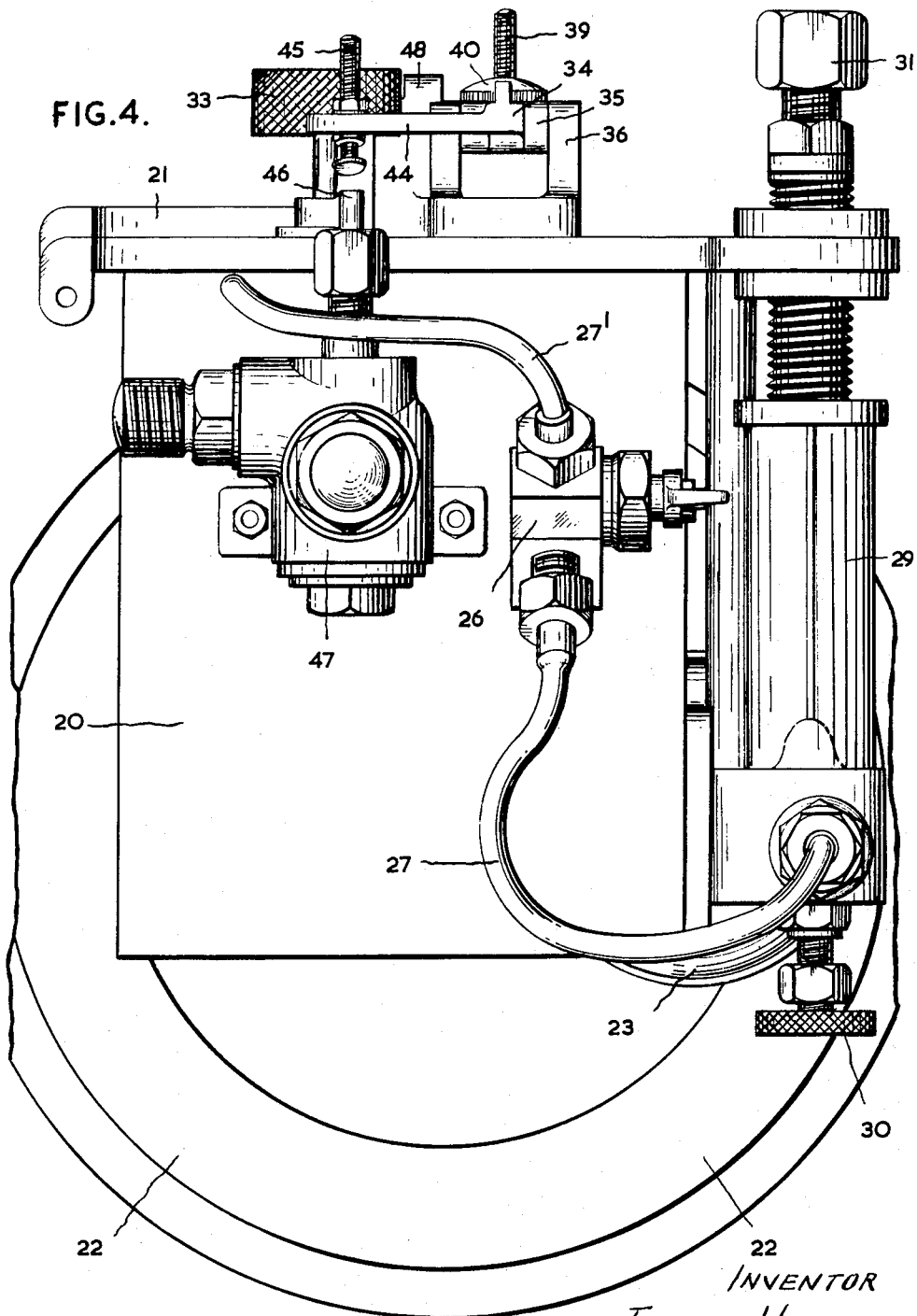

June 19, 1956  J. HARRIS  2,751,044
MEANS FOR LUBRICATING MACHINERY
Filed Aug. 18, 1953  5 Sheets-Sheet 5
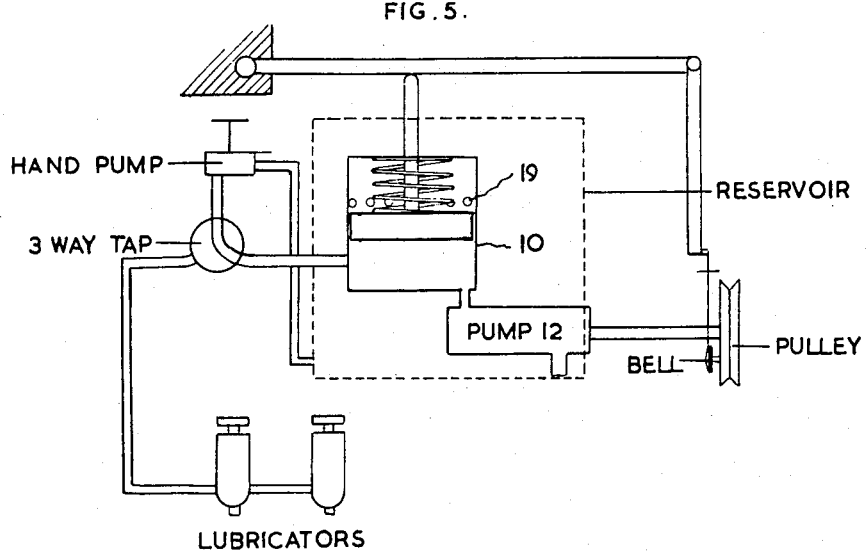
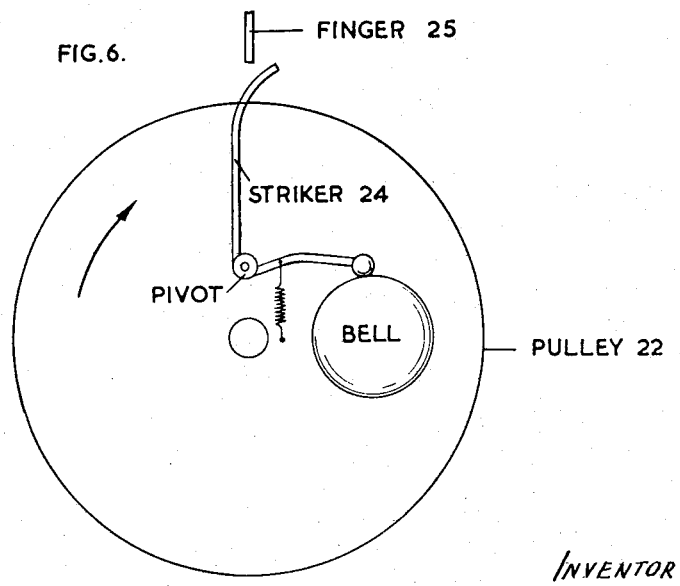
INVENTOR
JOSEPH HARRIS
by Walter S. Pleston
ATTORNEY

United States Patent Office 2,751,044
Patented June 19, 1956

2,751,044

MEANS FOR LUBRICATING MACHINERY

Joseph Harris, Nairobi, Kenya

Application August 18, 1953, Serial No. 374,874

Claims priority, application Great Britain
August 21, 1952

7 Claims. (Cl. 184—6)

This invention relates to improvements in means for supplying oil to the bearings and other rubbing surfaces of machinery, in particular stationary engines of the type which have drip-feed lubrication.

The lubrication of the bearings and rubbing surfaces of much machinery, in particular stationary steam and internal combustion engines, is usually carried out by means of sight drip-feed lubricators. These lubricators are commonly supplied from a main oil reservoir, the necessary pressure being supplied by a mechanical pump. Such machinery is frequently in the charge of unskilled operators, as in small power installations in outlying districts, and the oil reservoir may be allowed to run dry. This results in damage to the machinery which causes serious interruption of work and necessitates expensive replacements. Even in cases where no damage results, air is liable to find its way into the oil supply system and there is an interruption of work while the air is cleared by hand operation of the pump or pumps.

The present invention safeguards the machinery, gives a continuing oil supply for a short time after the reservoir has run dry, and gives audible or other warning that attention is required.

According to my invention, in a lubrication system for an engine or other machine an oil pump driven by a moving part of the machine delivers oil in excess of the requirements of the machine through a non-return valve into one end of a cylinder from which the oil is fed to sight drip-feed or other lubricators, and a spring-loaded piston working in the cylinder is adapted to be displaced axially by the oil to uncover an overflow port or ports in the cylinder wall so long as the oil supply is maintained by the pump at a pressure determined by the loading on the piston, failure of the oil supply from the pump allowing the spring to move the piston axially to close the overflow port or ports and to maintain a pressure on the oil in the cylinder while the displacement of the piston operates a warning device and/or stops the machine.

The cylinder is conveniently mounted in the oil reservoir from which the pump draws oil so that the surplus oil from the cylinder returns directly into the reservoir. Preferably a manually operated pump is provided for feeding oil under pressure from the reservoir into the cylinder to allow the drip-feed or other lubricators to be checked and adjusted before the machine is started.

The axial movement of the piston on failure of the oil supply may operate a visual or an audible indicator and the arrangement may be such that if the oil supply in the reservoir is replenished immediately the warning is given the machine need not be stopped, but if the warning is ignored the machine is automatically stopped before the oil in the cylinder is completely used up. For example, in the case of an internal combustion engine the fuel supply may be cut off or the ignition circuit switched off.

Thus my improved lubrication system provides an effective safeguard against damage to the bearings of an engine or other machine through failure of the oil supply.

Further, as the system is never completely drained of oil no air can find its way into the supply line to the lubricators.

One practical lubrication system in accordance with my invention, suitable for use with a stationary engine, is illustrated by way of example in the accompanying drawings in which:

Figure 4 is an end elevation of the unit.

Figure 5 is a diagrammatical reproduction of the whole layout.

Figure 6 shows the method of activation of the alarm bell.

Figure 1:
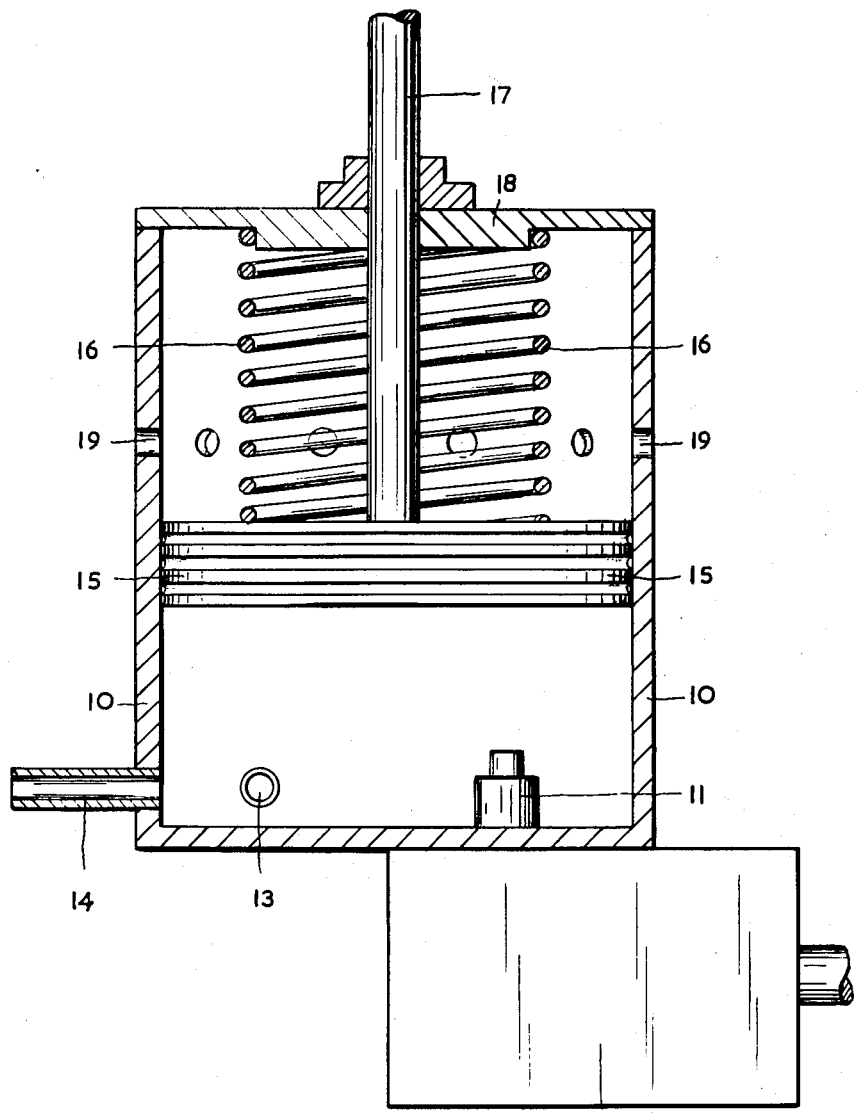
Figure 1 is a diagrammatic view of the feed cylinder and the associated parts.

In Figure 1, which is a diagrammatic view, 10 is a cylinder which is adapted to be mounted with its axis vertical within an oil reservoir. Oil is delivered under pressure into the bottom end of the cylinder through a non-return valve 11 by a gear-pump or other pump 12 which is driven by a rotating part of the engine and draws oil from the reservoir. Oil can also be delivered into the cylinder through a pipe 13 by a hand pump, and oil is fed from the cylinder through a pipe 14 to drip-feed lubricators leading to the various bearings of the engine.

Working in the cylinder is a piston 15 which is loaded by a compression spring 16 which urges it towards the bottom of the cylinder. The piston is secured to a piston-rod 17 which extends through a cover 18 for the upper end of the cylinder and is adapted to control the operation of a warning device and/or means for stopping the engine.

Overflow ports 19 are provided in the wall of the cylinder a short distance from its upper end.

While the engine is running the pump 12 delivers oil into the cylinder at a rate in excess of the engine requirements and the oil forces the piston upwardly until it uncovers the ports 19 sufficiently for the surplus oil to pass into the reservoir. The spring-loading of the piston maintains a constant pressure in the cylinder and the oil is delivered at that pressure to the lubricators. If desired a pressure gauge may be connected to the pipe line between the pressure cylinder and the lubricators.

If the reservoir is allowed to become empty the pump ceases to deliver oil into the cylinder and the piston is moved downwardly by the spring to maintain the oil supply to the lubricators until the reservoir is replenished, and if that is not done the continued descent of the piston rod operates a warning device and/or stops the engine.

Figure 2:
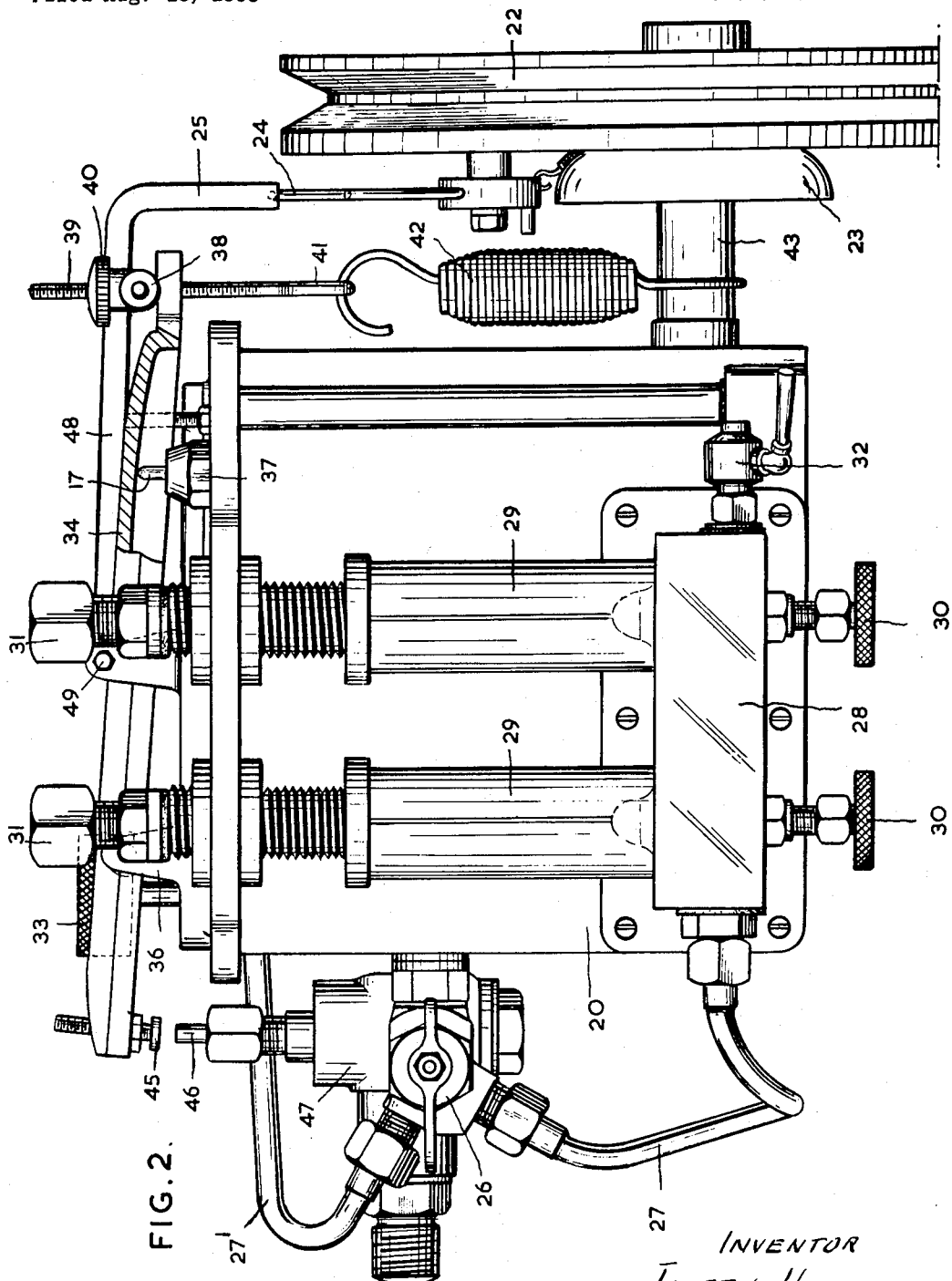
Figure 2 is a front elevation of the complete unit.
Figure 3:
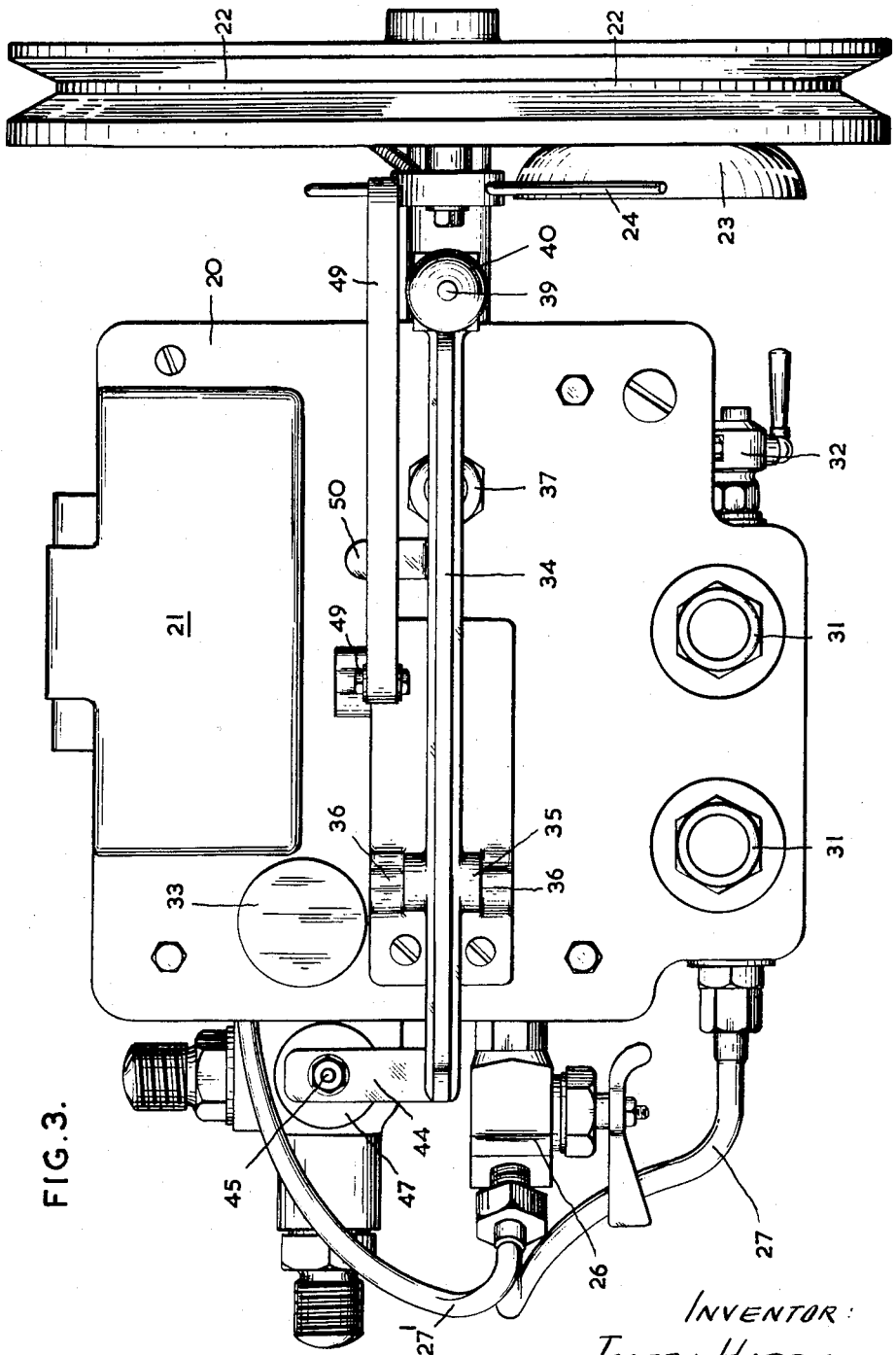
Figure 3 is a plan of the unit.

In the practical unit shown in Figures 2, 3 and 4 the parts shown in Figure 1 are incorporated within a rectangular casing 20 forming the oil reservoir. Oil is introduced into the reservoir through an opening in the cover provided with a hinged lid 21. The shaft of the pump is extended through a bearing sleeve projecting from the side of the casing and carries a pulley 22 by which it is driven through a belt from the crankshaft of the engine or other convenient rotating member. Mounted on the inner face of the pulley are a bell 23 and a pivoted striker 24 adapted to be engaged by a finger 25 when the oil reservoir is allowed to become empty. It is arranged that when the oil reservoir is allowed to become empty, the finger 25 drops sufficiently so that the striker 24 which is mounted on the rotating pulley 22 engages this finger, so that the striker is pulled away from the bell 23 against the action of a spring and then when it clears the finger 25 on further rotation, strikes a bell to give a warning signal; the bell is thus sounded once in every revolution of the pulley 22 so long as the finger 25 is lowered into the path of the striker 24.

The oil cylinder 10 represented diagrammatically in

Figure 1 is contained within the right-hand end of the reservoir 20 as shown in Figure 2, the piston rod 17 projecting through a gland nut 37 on the cover of the reservoir. It will be understood that the pump 12 is contained in the lower part of the reservoir beneath the cylinder 10. The overflow from the apertures (Figure 1) in the periphery of the cylinder 10 simply falls back into the reservoir formed by the casing 20.

The oil delivery outlet from the cylinder 10 within the casing is connected to a three way cock 26. When the cock handle is in the position shown in Figure 2 the delivery outlet is closed. When the handle is turned downwardly it connects the delivery outlet to a pipe 27 leading to an oil channel or gallery 28 feeding sight drip-feed lubricators 29. Each lubricator is independently controlled by a needle valve 30 and supplies oil to a union 31 adapted to be connected by a pipe to one of the engine bearings. Two lubricators have been illustrated but it will be understood that there may be any number. The end of the channel or gallery remote from the feed pipe 27 is provided with an air vent or drain cock 32.

When the handle of the cock 26 is turned upwardly it connects the pressure cylinder 10 through a pipe 27' with the delivery of a hand-pump mounted in the casing and actuated by a vertical plunger having a head or knob 33.

A substantially horizontal lever 34 is pivotally mounted at 35 between lugs 36 on the cover of the reservoir. This lever is adapted to be engaged by the piston-rod 17 of the spring-loaded piston in the pressure cylinder 10 which projects through a gland nut 37 on the cover. The extremity of the lever provides a seating for a trunnion 38 through which is screwed a rod 39 provided with a milled nut 40 bearing on the upper surface of the trunnion. The lower end of the rod is formed as a hook 41 to which is attached the upper end of a spring 42 of which the lower end is attached to the sleeve bearing 43 for the pump shaft. The spring applies a downward pull to the lever and so applies a downward thrust to the piston in the pressure cylinder through the piston-rod. This spring may replace or may be supplementary to the spring 16 in the cylinder. The spring loading and hence the pressure maintained on the oil in the pressure cylinder can be adjusted by means of the nut 40. The lower end of this nut is of recessed or saddle shape to engage the surface of the trunnion 38 so that its position will not alter under vibration.

The opposite end of the lever 34 carries a laterally projecting lug 44 through which is screwed an adjustable tappet 45. This tappet is adapted to engage the stem 46 of a valve housed in a body 47 connected into the fuel supply line to the engine. This valve is normally biased towards the closed position by a spring. Alternatively, the tappet may operate a switch in the ignition circuit of the engine.

A second lever 48 is pivotally mounted at 49 on the cover of the reservoir and lies parallel to the lever 34. A lug 50 projecting laterally from the lever 34 lies under the lever 48, and the free end of the lever 48 is cranked downwardly to form the finger 25 referred to above.

In the drawings the parts are shown in the positions they assume when the engine is at rest and there is no pressure in the oil supply cylinder 10.

Before starting the engine the handle of the cock 26 is turned upwardly to connect the hand pump to the pressure oil cylinder 10 and the hand pump is operated. This feeds oil into the cylinder and raises the piston 15 up to the level of the over-flow ports 19 against the spring loading on the piston. The handle of the cock 26 is then turned downwardly to connect the perssure cylinder to the channel or gallery 28 into which oil is forced by the spring-loading of the piston. The vent cock 32 is opend to check that ther is no air in the system and that the oil is flowing, and then that cock is closed and the lubricators are adjusted to the correct rate of flow of the oil.

The engine is then started and the oil pump is driven and maintains a full supply of oil to the pressure cylinder and so to the lubricators.

It will be appreciated that the filling of the pressure cylinder by the hand pump and the raising of the piston has rocked the lever 34 about its pivot, raising one end which lifts the lever 48 and carries the finger 25 clear of the striker 24 on the pulley and depressing the other end which through the tappet 45 opens the valve 47 and allows fuel to pass to the engine.

These conditions remain constant so long as the engine is running and there is oil in the reservoir for the pump to draw on.

If the reservoir should be allowed to become empty no more oil will be fed into the pressure cylinder and the piston 15 will descend in the cylinder under the action of its spring. This will maintain the oil supply to the lubricators for a certain time, and as the piston with its piston-rod descends the lever 34 is pulled down by its spring and allows the lever 48 to swing down until the finger 25 comes into the path of the striker 24 and the bell 23 is rung to warn the attendant. If he replenishes the reservoir immediately the pump again delivers oil into the pressure cylinder, the piston is raised again to the level of the overflow ports, the bell ceases to ring, and nothing further happens.

If the attendant fails to replenish the reservoir the piston continues its descent and the lever 34 is rocked over until the tappet 45 has been raised sufficiently far to allow the valve 47 to close and cut off the fuel supply to the engine.

It will be appreciated that the warning will be sounded and the engine stopped if the oil pump fails to deliver oil for any reason. If the drive to it is interrupted by the breakage of the belt and hence the pulley 22 stops rotating, the warning will not sound, but the subsequent cutting-off of the fuel supply to the engine will take place as before.

I claim:

1. A lubrication system for a power machine having lubricators of controllable flow through which oil is fed to different rubbing surfaces in the machine comprising an oil pump adapted to be coupled to and driven by a moving part of the machine and to deliver oil in excess of the requirements of the machine, a pressure cylinder of substantial volume into which oil from the pump is delivered, a spring-loaded piston working in said cylinder and displaceable axially in one direction by the oil against the spring-loading, an overflow port in the cylinder wall which is at least partially uncovered by said piston so long as the oil supply is maintained by the pump at a pressure determined by the loading on the piston, means for feeding oil from said pressure cylinder to said lubricators, a warning device, and means actuated by axial movement of the piston by said spring means in the opposite direction on failure of the oil supply from the pump for operating said warning device, said cylinder being of such a capacity in relation to the flow through said lubricators that oil is fed by axial movement of said piston as a result of said spring loading to said lubricators after failure of said oil supply and after operation of said warning device for a sufficient time to enable action to be taken to restore said oil supply.

2. A lubrication system as in claim 1 comprising means for stopping the machine operated by the further axial movement of the piston following the operation of the warning device, but before the exhaustion of the oil from said cylinder.

3. A lubrication system as in claim 1 comprising an oil reservoir wherein said cylinder is mounted and from which said pump draws oil.

4. A lubrication system as in claim 1 comprising a hand pump for delivering oil into the pressure cylinder when the machine is stationary.

5. A lubrication system as in claim 1 comprising an oil reservoir wherein said cylinder is mounted, a piston-rod attached to said piston and projecting from the reservoir, a spring-loaded lever pivotally mounted on the reservoir and cooperating with said piston-rod, and means actuated by said lever for operating a warning signal and for stopping the machine.

6. A lubrication system as in claim 1 comprising means for adjusting the spring loading of said piston in the pressure cylinder.

7. A lubrication system for a power machine having lubricators of controllable flow through which oil is fed to different rubbing surfaces in the machine comprising an oil reservoir, a pump mounted in and drawing oil from said reservoir and adapted to deliver oil at a rate in excess of the requirements of the lubricators, means for driving said pump from a moving part of the machine, a pressure cylinder of substantial volume mounted with its axis vertical in said reservoir, a connection from the delivery side of said pump to the bottom end of said cylinder, the entire output of the pump flowing through said connection to the cylinder, a connection from the bottom end of said cylinder to the lubricators, a piston working in said cylinder, spring means urging said piston downwardly, at least one overflow port in the wall of said cylinder at an intermediate point in the length thereof leading into the reservoir and adapted to be uncovered by said piston when it has been raised through a predetermined distance by oil delivered into the cylinder by the pump, a piston-rod attached to said piston and projecting from the top of said reservoir, a lever pivotally mounted on said reservoir and co-operating with said piston-rod, adjustable spring means acting on said lever to move it angularly in a direction to apply a downwardly directed pressure to said piston-rod and piston, a warning device, and means for stopping the machine, said warning means and stopping means being actuated in succession by said lever when said piston has moved downwardly in the pressure cylinder through a predetermined distance on failure of the oil supply delivered by the pump into the pressure cylinder, said stopping means being actuated before exhaustion of the oil from the cylinder.

References Cited in the file of this patent

UNITED STATES PATENTS

| 1,404,328 | Stearns | Jan. 24, 1922 |
| 1,663,218 | Schultz | Mar. 20, 1928 |
| 2,543,784 | Kyle | Mar. 6, 1951 |

FOREIGN PATENTS

| 3,647 | Great Britain | of 1913 |
| 194,835 | Switzerland | Mar. 16, 1938 |